United States Patent [19]

Lui

[11] Patent Number: 4,591,530
[45] Date of Patent: May 27, 1986

[54] SOFT CERAMIC KITCHENWARE INTERNALLY COATED WITH A NON-STICK RESIN

[75] Inventor: Umberto Lui, Fano, Italy

[73] Assignee: T.V.S. S.p.A., Trasanni Urbino, Italy

[21] Appl. No.: 602,172

[22] Filed: Apr. 19, 1984

[30] Foreign Application Priority Data

May 3, 1983 [IT] Italy .................. 20902 A/83

[51] Int. Cl.$^4$ ............ B32B 18/00; B32B 27/00; B32B 15/04
[52] U.S. Cl. ................ 428/325; 428/402; 428/421; 428/210; 428/472; 428/448; 427/376.2
[58] Field of Search ........... 428/421, 210, 472, 325, 428/402

[56] References Cited

U.S. PATENT DOCUMENTS

| | | | |
|---|---|---|---|
| 3,060,610 | 10/1962 | Stangel | 428/210 |
| 4,204,021 | 5/1980 | Becker | 428/421 X |
| 4,250,215 | 2/1981 | Mayer | 428/421 X |
| 4,311,755 | 1/1982 | Rummel | 428/448 X |

*Primary Examiner*—P. C. Ives
*Attorney, Agent, or Firm*—Bucknam and Archer

[57] ABSTRACT

To assure anchorage of a non-stick resin (18) to the ceramic biscuit (10) of a kitchenware a bonding means is used made up of a lead-free frit (12) having a melting point lying between 500° and 950° C. and including a glaze which melts essentially at these temperatures and that penetrates and bonds inside the pores (15) of the biscuit, and at least one substance that does not melt at the melting temperature of the glaze and which forms surface grains, or ovules (17) enclosed in the melted part (16) and anchored to the base of the biscuit. The non-stick resin emulsion (18) is spread over the rough layer which is successively fired by fusion.

8 Claims, 3 Drawing Figures

SOFT CERAMIC KITCHENWARE INTERNALLY COATED WITH A NON-STICK RESIN

The present invention refers to soft ceramic kitchenware internally coated with a non-stick resin and the relative method to achieve this.

As is known, the cooking of foodstuffs in water presents some drawbacks due to the fact that the dispersed substances, especially the starch and proteic substances tend to sediment and when coming into contact with the bottom which is at a high temperature, coagulate, adhere to the bottom and partially carbonize, negatively affecting the flavor and the quality of the food.

This drawback occurs mainly in recipes that require simmering (barbotage), or concentration by evaporation, as in the preparation of sauces.

Also cooking in boiling fats (fried foods), or on a grill causes the food to stick to the recipient bottom and the formation of degradation products, unpleasant in smell and taste, as well as being toxic.

The discovery of high melting point resins and with special hydrophobic characteristics as for example, polytetrafluoroethylene has made it possible to create surfaces to which the foodstuffs do not stick. This is due to the fact that a gas, or vapor film forms between the resin and the boiling, or roasting foods maintained by the impossibility of the water from penetrating therein, thanks to the hydrophobicity of the resin.

Since these resins cannot withstand direct heating by the flame, it is necessary to sustain them on a conducting support. However, it is precisely the chemical inertia and non-stick characteristics of the above mentioned resins that renders their direct application on the support difficult. In fact, thermal expansions cause the separation of the applied resin layer, since it is only laid on and is weakly anchored.

Many systems have been realized to anchor the resins to the metal in order to coat metallic and in particular aluminum kitchenware. One of the anchoring systems foresees the formation of an area, or the application of one, or more intermediary layers like paints, which are anchored to the metal and that bond with the resin. Another anchoring system foresees a modification of the resin by incorporating essentially metallorganic, or particular silicate products which increase the possibility of bonding the resin to the metal, or to the intermediate paint.

However, several cookery recipes exist and above all a number of specialities of regional cuisines which are more successful inside heavy containers having a alow thermal conductivity, as in the case of earthenware.

In this type of kitchenware, the problems described above have remained unchanged to-date, in addition to which it is necessary to add the ease of absorbing degraded fats and the inevitable introduction of unpleasant smells into the saucepan, after its use, due to the micro-fermentation of the products absorbed. The phenomenon rapidly worsens with time, because the enamel readily tends to fracture along minute cracks, which give rise to an aesthetic deterioration and to a degradation in functionality.

The non-stick resin coating, particularly of polytetrafluoroethylene, or the pre-fired ceramic would appear to be the most rapid and simplest solution to the problem, according to the experience in the coating of such resins or metals.

However, the coating of pre-fired ceramic using non-stick resin in practice is not achievable with success, since on the normal biscuit the resin layer only adheres over the immediate flat contact surfaces, whereas the porous material entraps a large amount of air deep down, therefore the result is that the successive heating of the porous mass forces the air against the resin and exerts a pressure which separates the particles of fired material incorporated in the resin and the film becomes detached over long sections.

On the other hand, application of the resin over the glaze of the finished earthenware does not overcome the problem since adhesion of the resin over the glossy vitrified surface of the molten glaze is virtually zero.

The aim of the present invention is to provide a system which makes it possible to coat kitchenware made of soft ceramic in a satisfactory manner.

According to the present invention this and other aims which will be detailed in the description that follows are achieved by arranging a bonding layer consisting of a lead-free frit for ceramics between the ceramic material forming the kitchenware and the high melting point and hydrophobic resin, with a melting point lying between 500° and 950° and including: (a) a glaze which melts essentially at these temperatures and which penetrates and is anchored within the pores of the ceramic biscuit, eliminating part of the air, and (b) a quantity of less than 50% by weight of at least one substance which essentially does not melt at the melting temperature of the glaze, or which solidifies immediately when a slight temperature drop occurs, and that forms a diffused surface granulation with hard grains absorbed in the melted part and anchored to the base of the ceramic biscuit.

Quantities of substance (b) lying between 15 and 30% by weight are preferred.

The glazes are actually of glass, more, or less opaque or colored with metal oxides consisting of feldspars, borax, quartz, carbonates, alkalines, oxides, alkaline chlorides, alkaline sulphates, ashes, flux and/or oxidising.

Depending on the presence, or otherwise of some of these components and of their proportions, glazes are obtained that melt and vitrify at different temperatures and may therefore be used at different cooking temperatures.

Thus, glazes exist which melt at around 500°–560° C., others which mel at around 800°–850° C. and still others at around 850°–950° C.

In general, the presence of calcium borate lowers the metling temperature, whereas the presence of aluminum phosphate mixed with boric acid increases the melting point.

The compositions of these glazes are known and generally used to enamel ceramic, or metallicmaterials.

A glaze that readily melts at 500°–55° C. is the following:
zinc oxide : 0.3 Kg;
lime : 0.6 Kg;
potash: 0.3 Kg;
aluminum : 0.4–0.55 Kg;
silica : 2.5 Kg;
boric acid : 8 Kg;
Another example of a glaze may be:
zinc oxide : 2.5–3.5 Kg;
potash : 1–1.5 Kg;
silica : 6 Kg;
boric acid: 1–2.5 Kg.

The substances which do not melt at the melting temperature of the glaze, or solidify immediately with a slight temperature drop can be selected within a vast range of products which may be: cyolite, alumina, silica, quartz, kaolin, petalite, zirconia, etc. or their mixtures.

For example weakly melting mixture may be formed from clay and quartz with approximately 7.5% of silica ($SiO_2$) by weight. The substance which essentially does not melt at the melting temperature of the glaze is selected as a function of this temperature. Hence, for example when a glaze is used which melts at 500°–550° C. the substance to be added must have a melting point higher than 550° C.

The resin layer, or layers are arranged within the apexes of the rough surface of the frit layer anchored in the biscuit and are sprayed to a minimum thickness over the apexes and a significant thickness over the depressions.

The successive firing to melt the resin inside an oven at a temperature lying between 350°–450° C., makes for the continuity of the layer in which the apexes remain partially porous to permit the escape of small quantities of residual gases and act as a protection for the base layer of the depressions protecting it against long abrasions. Furthermore, the very slight roughness, route for the residual gases, maintains numerous very thin separation areas between the foodstuff and the resin, which make the non-stick action more efficient. Furthermore, the small dispersed grains, or from first precipitation obtained by a temperature drop, dispersed within the glaze, are very hard and prevent embedding of the knifeblade during use and extensive cutting of the coating by the knife blade itself.

A further advantage of the treatment according to the present invention lies in the fact that the frit may be sufficiently hard, without the concern of having a high expansion coefficient, because the resin acts as an expansion joint. For this purpose frits of any nature suitable and compatible with the base earthenware are valid. In particular, it is possible to use silica anhydride based frits partially replaced with boric acid to favor penetration into the biscuit.

It is also possible to avoid the use of enamels with lead, since the toxicity of this metal both in processing and in use is known.

For greater clarity, the figures of the attached drawing schematically represent the essential characteristics of the use of an anchoring frit according to the present invention, with respect to a normal glaze, enlarging the representation.

Figure 1:
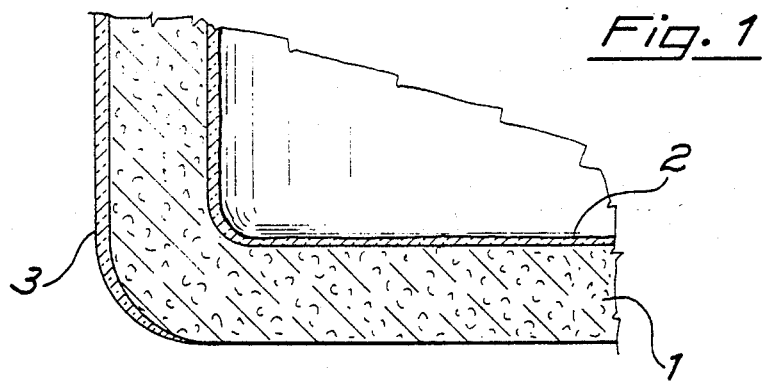
FIG. 1 represents the schematic view of a normal vitrified earthen pot.

In FIG. 1, a compact and smooth glaze 2, completely homogeneous, has been applied on the inside of the earthen pot 1 by melting, and a second glaze 3 on the external sides and possibly also over the bottom.

Figure 2:
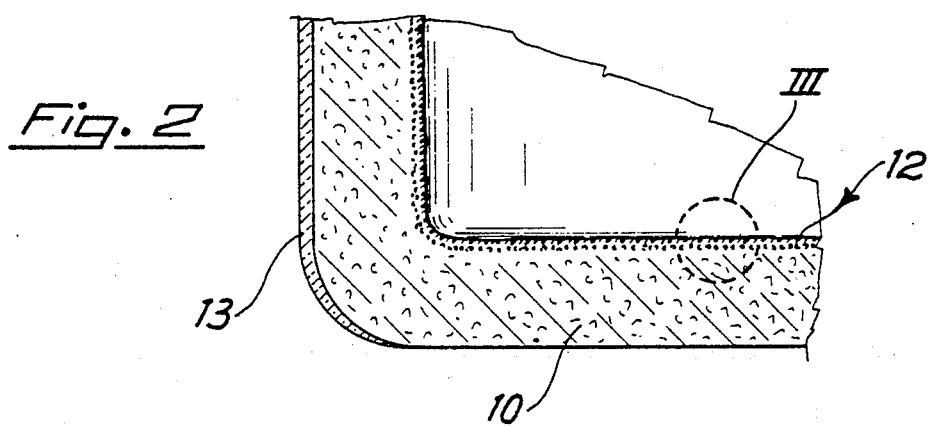
FIG. 2 represents the schematic view of an earthen pot treated with anchoring frit and then covered with non-stick plastic.
Figure 3:
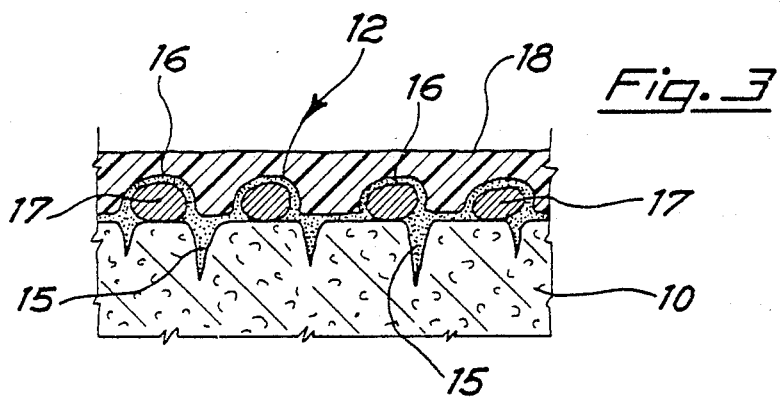
FIG. 3 represents detail III of FIG. 2 enlarged.

In FIG. 2 an external decorative enamel 13 has been applied on the earthen pot 10, formed, dried and fired according to the traditional technique, possibly extended over the bottom, whereas a layer of frit 12 has been applied on the inside, which after firing at 500°–950° C. gives rise to a surface roughness in the form of small ovules 16, dispersed in the vitrified product 15 and which extends over the surface of the earthen pot 10 and forms a bond and penetrates inside the larger pores to a certain depth.

The roughness encloses creative nuclei 17, added by the frit, for example, pulverised quartz, or made up among the components (for example a silicate complex) having a high melting point, which are enucleated during the first cooling phase. The form of the layer made by the frit after melting is essential. The emulsion 18 of the non-stick resin is spread over this rough layer, which manifests itself as though it had small papillae, in its natural form or added with coloring, hardening agents, etc.

For example, numerous limiting compositions of frits are given which provide these layers. These compositions are provided for an exemplificative and non-limitative purpose, since they may be altered and modified by the assigned technician adapting them to the type of basic earthen pot, since it is known that earthenware is a soft-ceramic with many diversifications which even lead to it being confused with porcelain, or hard ceramic. For this reason the two extremes are mentioned with melting points at the limits of the application range, which lies between 500° and 950° C.

EXAMPLE I a frit made up as follows is used:

lead-free galze for ceramic (consisting of zinc oxide : 2.5 Kg; potash : 1.5 Kg; silica: 9.6 Kg and boric acid 2.4 Kg): 50 parts by weight; kaolin: 20 parts by weight; pulverised quartz: 15 parts by weight.

The biscuit is pulversied in a grinding mill and mixed with water and 5 parts by weight of clay, in order to be able to spread it in a thin and uniform layer.

This frit is spread over the biscuit preferably with a thickness of 10–15 micron.

The biscuit absorbs the water and causes the crystals to become arranged inside the partially dehydrated colloidal mass of the kaolin and of the fluxes. After drying, the biscuit is introduced into the oven and fired at 950° C. for approximately 1–2 minutes, until the glaze melts. The colloidal mass, porous due to the evaporation of the water, melts, shrinks, partly vitrifies on the surface of the biscuit and penetrates into the pores.

Part of the quartz grains remain on the outside and lined by the said molten glaze, which create numerous nodules often also with undercut. The non-stick resin is sprayed onto the rough, cooled and consolidated layer obtained in this way, for example polytetrafluoro-ethylene emulsion, which levels and covers the depressions and apexes of the molten frit.

The layer with a smaller thickness of the apexes may also be microporous, i.e. porous to the gases and impervious to water and to the fats. The residual microdepressions render the non-stick effect more efficient.

The non-stick resin coating may be applied by spraying, by brush, by immersion etc. and may be made with one or more layers. Furthermore, the non-stick resin may have pigments added. The coated product is fired at 350°–450° C.

EXAMPLE II

When a biscuit is available, prepared at a lower temperature, recourse is made to a glaze having a significantly lower melting point. The purpose of having a roughened coating, but anchored onto the earthen pot may be achieved, by adopting a glaze made of:

0.3 Kg. of zinc oxide;
0.6 Kg. of calcium;
0.3 Kg. of potash;
0.4–0.55 Kg. of alumina
2.5 Kg. of silica and
8 Kg of boric acid, which melts at 530°-550° C.

The addition of quartz, also in this case, leads to the formation of non-homogeneous nuclei in the melt, that constitutes the base, on which the rough ovule type surface is established formed around the nuclei.

The composition of the frit may vary within a wide range depending on the type of biscuit, the required melting point of the meltable part etc. hence, for example, the silica anhydride may be partially replaced with boric acid, or it is possible to add alumina in an excess quantity.

Changes, modifications and variations may be made to the present invention always with the aim of obtaining a rough solidified layer with dispersed nodules, or created by intermediate compounds following an initial cooling, covered by the melt, which covers them and anchors them to the base of the ceramic biscuit.

I claim:

1. Soft ceramic kitchenware consisting of a ceramic material having pores, a coating of a non-stick resin on the food contacting surface and an intermediate bonding layer consisting of a lead-free frit, said frit having a melting point between 500° and 950° C., said frit consisting of:
    (a) A glaze of melting point essentially between 500° and 950° C., said glaze penetrating and anchoring to the pores of said material, thus eliminating the air present in the pores,
    (b) a substance which does not melt at the melting temperature of the glaze or which solidifies substantially immediately when the temperature drops below said melting temperature of the glaze, said substance constituting more than 15% and less than 50% of said frit, said substance forming hard grains dispersed in the glaze.

2. Kitchenware according to claim 1, wherein the substance which essentially does not melt at the melting temperature of the glaze is a member selected from the group consisting of clay, cryolite, alumina, silica, quartz, kaolin, petalite, zirconia, and mixtures thereof.

3. Kitchenware, according to claim 1, wherein the substance which essentially does not melt at the melting temperature of the glaze is a mixture of clay and quartz containing approximately 7.5% by weight of silica.

4. Kitchenware according to claim 1, wherein said glaze consists of zinc oxide, potash, silica and boric acid, and melts at about 950° C. and said substance (b) consists of pulverized quartz and kaolin.

5. The kitchenware according to claim 1 wherein said glaze melts at 530°-550° C. and consists of silica, alumina, zinc oxide, calcium oxide, potash and boric acid.

6. Kitchenware according to claim 1 wherein the non-stick resin is polytetrafluoro-ethylene.

7. Kitchenware according to claim 1 wherein said substance (b) is present in the amount of 15-30% by weight of said frit.

8. The kitchenware according to claim 2 wherein said substance (b) of the frit forms ovules dispersed in said glaze (a) and said ovules enclose grains of said clay, cryolite, silica, quartz, kaolin, petalite, zirconia and mixtures thereof.

* * * * *